(12) United States Patent
Yoshida et al.

(10) Patent No.: US 7,294,788 B2
(45) Date of Patent: Nov. 13, 2007

(54) COIL FOR ELECTRIC ROTATING MACHINE, AND MICA TAPE AND MICA SHEET USED FOR THE COIL INSULATION

(75) Inventors: Katsuhiko Yoshida, Yokohama (JP); Noriyuki Iwata, Sagamihara (JP); Hiroshi Hatano, Yokohama (JP); Susumu Nagano, Kawasaki (JP); Shinobu Sekito, Yokohama (JP); Toshimitsu Yamada, Yokohama (JP); Makoto Kawahara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/690,644

(22) Filed: Oct. 23, 2003

(65) Prior Publication Data

US 2004/0094325 A1    May 20, 2004

Related U.S. Application Data

(63) Continuation of application No. PCT/JP02/04033, filed on Apr. 23, 2002.

(30) Foreign Application Priority Data

Apr. 27, 2001    (JP) ............................. 2001-132940

(51) Int. Cl.
   *H01B 7/00*    (2006.01)
(52) U.S. Cl. ................................. 174/120 R
(58) Field of Classification Search ........... 174/120 R, 174/137 A; 310/45, 196, 201, 208
   See application file for complete search history.

(56) References Cited

U.S. PATENT DOCUMENTS

| | | | | |
|---|---|---|---|---|
| 2,320,922 A | * | 6/1943 | Ford ........................... | 336/94 |
| 4,471,256 A | * | 9/1984 | Igashira et al. ............. | 310/328 |
| 4,806,806 A | | 2/1989 | Hjortsberg et al. | |
| 6,022,584 A | * | 2/2000 | Kahn et al. .................. | 427/100 |
| 6,069,430 A | * | 5/2000 | Tsunoda et al. ............. | 310/180 |
| 6,242,825 B1 | * | 6/2001 | Mori et al. .................... | 310/45 |
| 2001/0030022 A1 | * | 10/2001 | Ishimatsu .................... | 156/332 |

FOREIGN PATENT DOCUMENTS

| | | |
|---|---|---|
| EP | 0939478 | 9/1999 |
| JP | 55-53802 | 4/1980 |
| JP | 58-144563 | 8/1983 |
| JP | 58-157348 | 9/1983 |
| JP | 59-28255 | 2/1984 |
| JP | 01 176257 | 7/1989 |
| JP | 5-111206 | 4/1993 |
| JP | 9-45133 | 2/1997 |
| JP | 11-213757 | 8/1999 |
| JP | 11-329126 | 11/1999 |
| JP | 2000-125499 | 4/2000 |
| JP | 2000-173818 | 6/2000 |
| JP | 2001-61247 | 3/2001 |

* cited by examiner

*Primary Examiner*—Chau N. Nguyen
(74) *Attorney, Agent, or Firm*—Oblon, Spivak, McClelland, Maier & Neustadt, P.C.

(57) ABSTRACT

A coil for an electric rotating machine is configured with a conductor which is formed by bundling a plurality of square strands and stacking the square strands like a coil with Roebel transposition, mica cape which is wound a plurality of layers around an outer surface of the conductor and made up of mica paper and glass cloth backing, and an insulation wall formed by impregnating and curing resin between wound layers of the mica tape. Inorganic particles are supported with the glass cloth backing on the mica tape using an adhesive containing glue insoluble in the impregnated resin as an indispensable component.

10 Claims, 2 Drawing Sheets

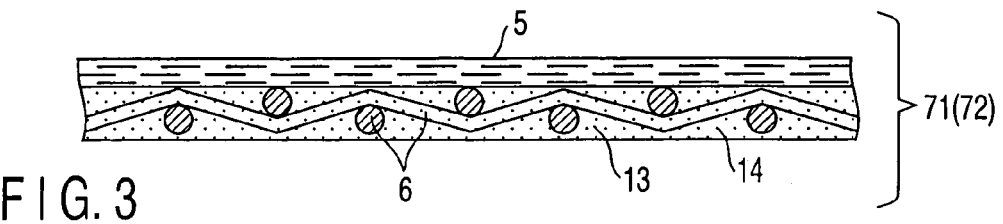
F I G. 3

COIL FOR ELECTRIC ROTATING MACHINE, AND MICA TAPE AND MICA SHEET USED FOR THE COIL INSULATION

CROSS-REFERENCE TO RELATED APPLICATIONS

This is a Continuation Application of PCT Application No. PCT/JP02/04033, filed Apr. 23, 2002, which was not published under PCT Article 21(2) in English.

This application is based upon and claims the benefit of priority from the prior Japanese Patent Application No. 2001-132940, filed Apr. 27, 2001, the entire contents of which are incorporated herein by reference.

BACKGROUND OF THE INVENTION

1. Field of the Invention

The present invention relates to a coil for an electric rotating machine, which is configured by forming an insulation layer on the periphery of a conductor, and mica tape and a mica sheet used for the coil insulation.

2. Description of the Related Art

In a stator of a high-voltage electric rotating machine such as a generator and a motor, as shown in FIG. 1, a plurality of slots 1a are formed on the inner surface of stator core 1. The each slot 1a accommodates a stator coils 2.

The stator coils 2 comprise an upper coil and a lower coil. To accommodate the upper and lower coils into the slot, insulation spacers 3 are inserted into the bottom of the slot 1a, between the upper and lower coils, and into the opening of the slot 1a.

Furthermore, a slot wedge 4 for securing the stator coil 2 is inserted in the open end of the slot 1a. The slot wedge 4 suppresses the stator coil 2 vibration generated from electromagnetic pulsating force due to load current in the conductor.

In the above stator of the high-voltage electric rotating machine, the stator coil 2 accommodated in the slot 1a of the stator core 1 is formed of a conductor that has the following structure.

First, a plurality of insulated square strands 21 are bundled and Roebel-transposed. After that, pre-preg separator 11 with thermosetting resin is arranged between a strand bundle 30a on the left side row in the figure and a strand bundle 30b on the right side row in the figure. Pre-preg filler 12 with thermosetting resin is arranged on the Roebel-transposed portion on top and bottom of the strand bundles 30a and 30b.

Then, the thermosetting resin in the pre-preg separator 11 and that of the pre-preg filler 12 are heated and cured while the strand bundles 30a and 30b are integrally molded in one piece by heat pressing. A conductor 22 is finished to finally have a section as shown in the figure by heating and curing the pre-preg separator 11 and pre-preg filler 12.

The conductor 22 is insulated by the following process called vacuum pressurized impregnation system with thermosetting resin.

A mica tape 7, which includes mica paper 5 and glass cloth backing 6 as shown in FIG. 2, is wound a plurality of layers around the conductor 22. Thermosetting resin is impregnated into the wound layers of the mica tape 7 under vacuum pressurized condition. After that, the thermosetting resin and the mica tape 7 are heated and cured by heat pressing while the stator coil 2 is molded to so as to have a final section. An insulation layer 8 is formed on the periphery of the conductor 22 by heating and curing the thermosetting resin and the mica tape 7.

In the stator coil 2 so configured, the conductor 22 generates heat by load current at the time of the operation of the electric rotating machine. Part of the generated heat is transmitted to the environmental cooling gas directly from ventilation ducts, which are arranged on the cross section of the stator core 1 at appropriate intervals in the axial direction, through the insulation layer 8. Most of the remaining generated heat is transmitted to the stator core 1 through the insulation layer 8 and then indirectly to the environmental cooling gas. When the generated heat is thus transmitted to the cooling gas, all the heat generated from the conductor 22 is cooled via the insulation layer 8 of the stator coil 2. From these points of view, the thermal conductivity along the heat passage is very important.

If the thermal resistance along the heat passage is high, the heat generated in the conductor 22 will be hard to transmit to the cooling gas and thus the temperature of the stator coil 2 will increase to excess. The excessive temperature rise accelerates the deterioration of electrical and mechanical performance of organic materials in the insulation layer 8 as the electric rotating machine is operated for a long time.

The above insulation layer 8 includes mainly mica paper 5, glass cloth backing 6, thermosetting resin, etc. The thermal conductivity of mica is about 0.5 W/m.K, that of glass is about 1.0 W/m.K, and that of epoxy resin, which is a typical thermosetting resin, is about 0.2 W/m.K.

In order to improve the thermal conductivity of the insulation layer 8, therefore, it is effective to reduce the volume of thermosetting resin with the lowest thermal conductivity.

Moreover, the impregnated thermosetting resin can easily be detained in the texture of the glass cloth backing 6 and in the mica paper 5. To prevent the thermosetting resin from being detained, the measures adopting a very thin glass cloth backing 6, squeeze out the impregnating resin by applying an appropriate molding pressure at the time of heating and curing, and the like are taken.

The prior art to positively improve the thermal conductivity of the insulation layer 8 of the stator coil 2 is disclosed in Jpn. Pat. Appln. KOKAI Publication No. 55-53802 (former) and U.S. Pat. No. 4,806,806 (latter).

In the former improved art, inorganic particles such as aluminum oxide and boron nitride having higher thermal conductivity than that of the resin are mixed with mica flakes together with synthetic fibers such as polyamide fibers. The inorganic particles so used each have a diameter of 30 μm to 100 μm. The synthetic fibers serve as a reinforcement member for the mixed mica paper.

In the latter improved art, the inorganic particles of high thermal conductivity are arranged not only in the mica paper but also between layers of the mica tape 7.

Specifically, the following techniques are disclosed:

(1) After a mica tape is wound around a conductor, a resin to which inorganic particles are added is impregnated and then heated and cured in a molding jig.

(2) A so-called pre-preg mica tape that is pre-impregnated with a resin containing inorganic particles is wound around a conductor and then heated and cured in a molding jig.

(3) A so-called pre-preg mica tape that is pre-impregnated with a resin is coated with inorganic particles on its surface and wound around a conductor. After that, it is heated and-cured in a molding jig.

(4) A thin insulation tape coated with inorganic particles is wound around a conductor, together with a mica tape, to form a main insulation layer.

However, there were some problems in taking the conventional measures to improve the thermal conductivity of the stator coil insulated by the above-mentioned vacuum pressurized impregnation method.

In the former method of mixing the inorganic particles with the mica flakes, together with the synthetic fibers such as polyamide fibers, the inorganic particles are buried and dispersed in the mica paper. Thus, the inorganic particles and the synthetic fibers make slits in the mica paper.

Consequently, in the impregnation of resin after the winding of mica tape around the conductor, the slits formed by the inorganic particles facilitate the resin impregnation. On the other hand, the slits formed by the inorganic particles that are present in the insulation layer provided on the peripheral surface of the conductor decrease the electrical strength.

In the case of method (1), or in the latter method of adding high thermal-conductivity inorganic particles to the resin and impregnating resin not only in the mica paper but also between layers of the mica tape, the added inorganic particles will precipitate during the storing of the impregnating resin. Moreover, the inorganic particles could be distributed unevenly as the result of filtering with the mica tape in the impregnation process.

In the case of method (4), a thin insulation tape coated with inorganic particles is wound more layers than necessary. Therefore, the increase of the thickness of the main insulation layer cannot be ignored.

The methods (2) and (3) are so-called pre-preg insulation system using a pre-preg mica tape. If these methods were introduced to the vacuum pressurized impregnation system, the following peculiar problems will arise.

In mica tape for the vacuum pressurized impregnation system, the mica flakes are adhered each another, and mica paper and glass cloth backing are also adhered with a minimum amount of adhesive. The adhesive must be dissolved with the impregnating resin during the impregnation process and they must be formed integrally as a main insulation wall through heat curing. Consequently, the adhesive is required to have mutual dissolubility with the impregnated resin. If, therefore, the impregnated resin is, for example, epoxy resin including a curing agent, the epoxy resin (which may contain an accelerator) is generally selected as an adhesive.

In order to improve the thermal conductivity with the mica tape according to the methods (2) and (3), retaining the inorganic particles arranged on the mica tape with a minimum amount of adhesive and forming a main insulation wall through heat curing after the impregnation process are required.

However, when the mica tape that holds the inorganic particles with the adhesive is wound around the conductor and then impregnated with resin in the impregnation process, the adhesive and the impregnated resin are dissolved each other and the resin viscosity temporarily decreases at the early stage of heat curing. For this reason, a part of resin including the inorganic particles flows out of the insulation layer.

Particularly, in a system that molds the conductor 22 by heat pressing, the squeeze-out of the inorganic particles increases as a molding pressure force to squeeze out an excess impregnated resin from the insulation layer.

The tendency of flow of the inorganic particles is more conspicuous in a system that is impregnated with a low-viscosity, high-solubility resin and molded at a high pressure.

In an insulation system configured by a vacuum pressurized impregnation system as described above, even though a given number of inorganic particles are added in advance to the mica tape, they will flow out during the molding. Therefore, the thermal conductivity cannot be improved as is expected.

BRIEF SUMMARY OF THE INVENTION

A coil for an electric rotating machine, and mica tape and a mica sheet used for the coil insulation are configured as follows.

A coil for an electric rotating machine is configured by bundling a plurality of square strands, stacking the square strands like a coil with Roebel transposition, winding mica tape which is made up of mica paper and glass cloth backing, a plurality of mica tape layers around the conductor, and impregnating and curing resin between wound layers of the mica tape to form an insulation wall. Inorganic particles are supported by the mica tape using an adhesive containing glue insoluble in the impregnated resin as a component.

Mica tape used for a coil insulation of an electric rotating machine comprises mica paper and glass cloth backing. Inorganic particles are supported with the glass cloth backing using an adhesive containing glue insoluble in impregnating resin as an indispensable component.

A mica sheet used for a coil insulation of an electric rotating machine comprises mica paper and glass cloth backing. Inorganic particles are supported with the glass cloth backing using an adhesive containing glue insoluble in impregnating resin as an indispensable component.

BRIEF DESCRIPTION OF THE SEVERAL VIEWS OF THE DRAWING

FIG. 3 is a sectional drawing showing mica tape (mica sheet) for explaining the first to third embodiments.

DETAILED DESCRIPTION OF THE INVENTION

Figure 1:
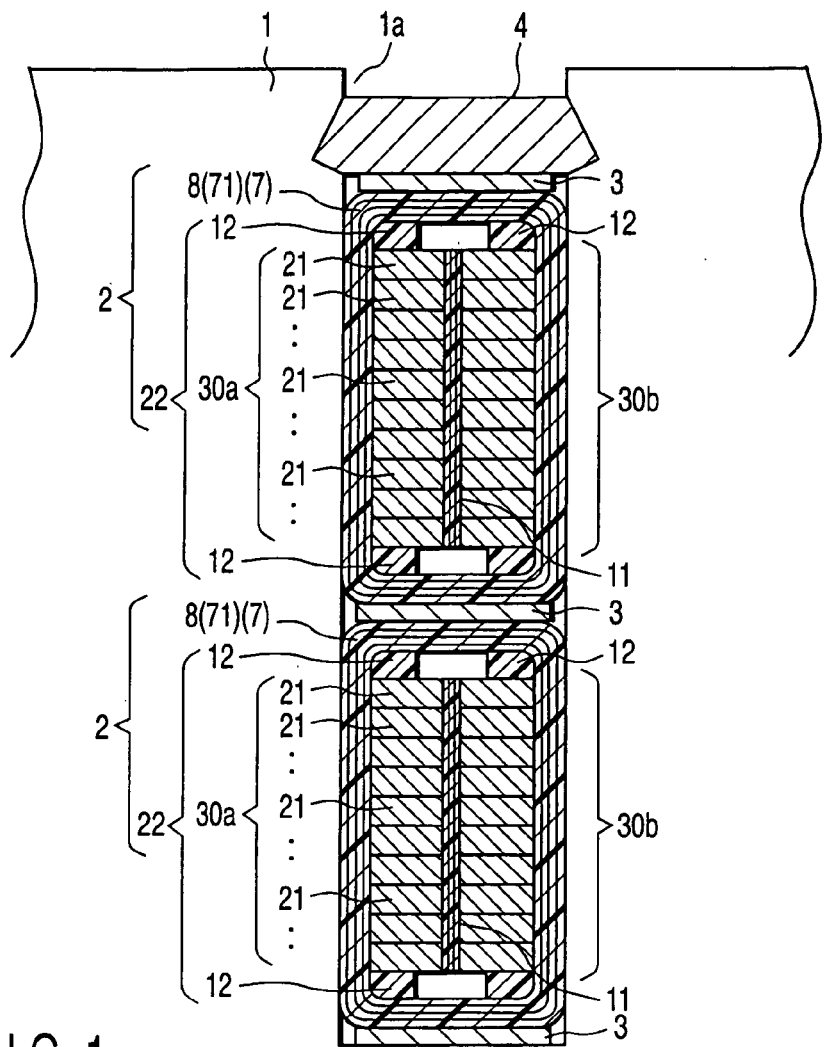
FIG. 1 is a sectional drawing of a stator coil accommodated in a stator core slot of a high-voltage electric rotating machine.
Figure 2:
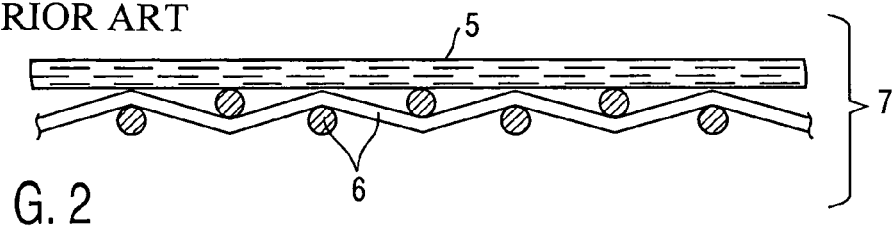
FIG. 2 is a sectional drawing showing mica tape that makes up an insulation wall formed on the periphery of a conductor of a conventional stator coil.

Embodiments will be explained below.

In a stator coil of a high-voltage electric rotating machine, a step of completely finishing a conductor having a final section from insulating square strands has already been described in Background Art. Hence, a first embodiment concerning an insulation wall 8 formed on the periphery of a conductor 22 will be explained with reference to FIGS. 1, 3, 4 and 5.

In the first embodiment, uncalcinated muscovite mica tape 71 having a structure as shown in FIG. 3 is wound a plurality of layers around the conductor 22. The uncalcinated muscovite mica tape 71 comprises mica paper 5 and glass cloth backing 6. Inorganic particles 14 are supported with the glass cloth backing 6 of the mica tape 71 using an adhesive 13.

The adhesive 13 contains glue that is insoluble in impregnating resin as an indispensable component. Favorably, an adhesive 13 containing 4 wt % of polyvinyl alcohol is used as a polyvinyl-based polymer that produces the effect of supporting the inorganic particles 14. Favorably, 30 wt % of aluminum oxide particles of mica tape are used as the inorganic particles 14.

As the adhesive 13, an epoxy resin composition (for example, Epikote 828 or 1001 manufactured by Yuka-Shell Co., Ltd.), which has mutual dissolubility with the impregnating resin, is used in addition to the polyvinyl alcohol.

After a thermosetting resin is impregnated into the mica tape layers 71 under vacuum pressurized condition, it is heated and cured by heat pressing at a pressure of 0.5 MPa while the insulation layer 8 is formed so as to have a final section.

The impregnating resin is, for example, a composition comprising a 45 wt % of cycloaliphatic epoxy compound, a 45 wt % of acid anhydride curing agent, and a 10 wt % of reactive diluent. This impregnating resin has a low viscosity of about 40 mPa.·s at room temperature.

For a try, the uncalcinated muscovite mica tape 71 of the present embodiment, in which only the additional amount of polyvinyl alcohol is changed, is wound a plurality of layers around the conductor 22 to form an insulation wall 8 having a final thickness of, e.g., 5 mm. The conductor 22 on which the insulation layer 8 is formed with the mica tape 71 is submerged in the impregnating resin and applied a pressure of, e.g., 0.7 MPa in the tank after vacuum treatment.

The time that lapses until the completion of resin impregnation and the weight of inorganic particles in the resin squeezed out at molding with heat pressing at the pressure of, e.g., 0.5 MPa are measured.

Figure 4:
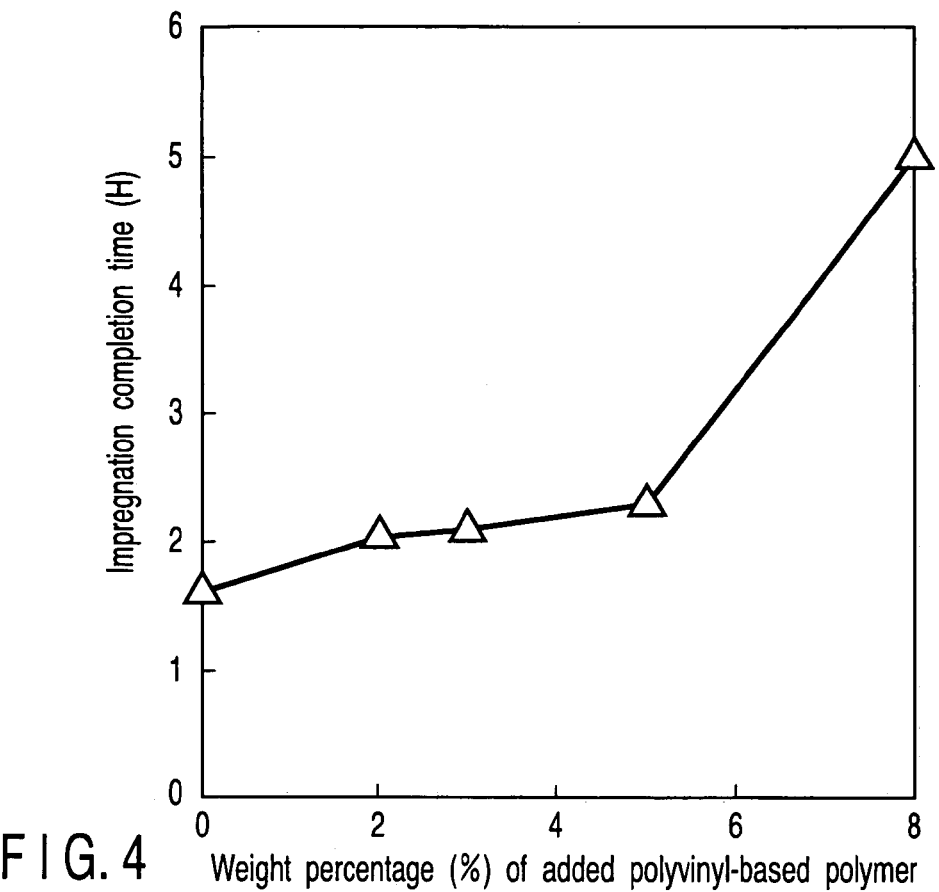
FIG. 4 is a graph showing measurement results of impregnating time of an insulation wall according to the first embodiment.
Figure 5:
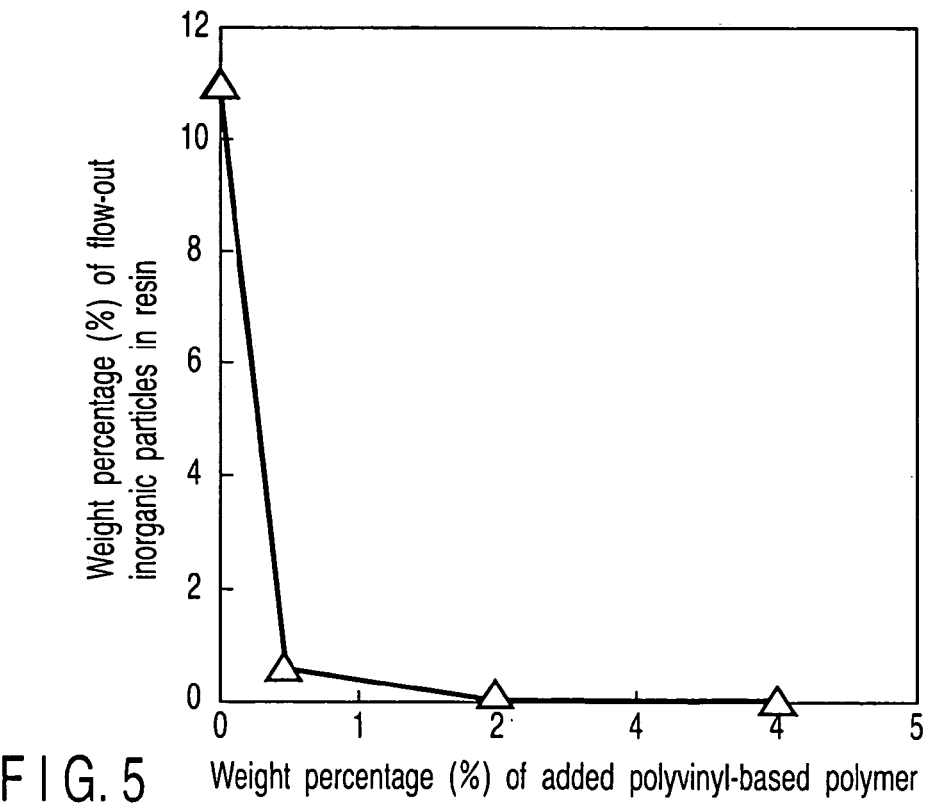
FIG. 5 is a graph showing the weight percentage of inorganic particles flowing out from the insulation wall according to the first embodiment.

FIGS. 4 and 5 are graphs showing results of the measurements.

As can be seen from the graph of FIG. 4, the impregnation time is suddenly lengthened when the amount of additional polyvinyl alcohol exceeds 5 wt %. This is because the polyvinyl alcohol forms a film barrier and inhibits the impregnating resin from being impregnated.

As can be seen from the graph of FIG. 5, when the amount of additional polyvinyl alcohol is not larger than 0.5 wt %, the inorganic particles 14 flow out of the insulation wall 8 with heat pressing at the formation of the insulation wall 8. Therefore, the thermal conductivity cannot be improved as is expected.

Consequently, polyvinyl alcohol is added favorably in an additional amount between 0.5 wt % and 5 wt % as glue included in the adhesive 13, and the inorganic particles 14 are supported with the mica tape 71. The above amount of additional polyvinyl alcohol and the supporting effect thereof exclude the influence of a long-time resin impregnation, and the inorganic particles 14 can be prevented from flowing out of the insulation layer 8; therefore, the thermal conductivity can be improved.

According to the first embodiment, the supporting effect of polyvinyl alcohol prevents the flowing out of the inorganic particles 14 with impregnated resin from the insulation wall 8 even when the heat pressing is applied to form a final section.

Hence, the thermal conductivity of the insulation wall 8 is improved and secondarily the falling of the inorganic particles 14 when the mica tape is wound can be decreased. Since, furthermore, the polyvinyl alcohol is added in an appropriate amount, the influence of a long-time impregnation can be lessened.

If, moreover, the stator that is accommodated the coil in a slot, the thermal conductivity of a heat pass from the conductor to the cooling gas is increased, so that the temperature rise of the stator coil can be decreased and the machine can be decreased in size.

A second embodiment will now be explained.

In the second embodiment, an adhesive 13 containing, for example, 3 wt % of polyvinyl butyral, which is a kind of polyvinyl acetal, is used as a polyvinyl-based polymer that is an indispensable component as glue. An uncalcinated muscovite mica tape 71 with the adhesive 13 is wound a plurality of layers around a conductor 22. The uncalcinated muscovite mica tape 71 is formed with supporting inorganic particles 14 of boron nitride particles on a glass cloth backing 6.

As the adhesive 13, an epoxy resin composition (for example, Epikote 828 or 1001 manufactured by Yuka-Shell Co., Ltd.), which has mutual dissolubility with the impregnating resin, is used in addition to the polyvinyl butyral.

After a thermosetting resin is impregnated, the wound layers of the mica tape 71 under vacuum pressurized condition is heated and cured by heat pressing at a pressure of, e.g., 0.5 MPa while a stator coil 2 is formed to a final section. An insulation wall 8 is formed on the periphery of the conduct 22 due to the heating and curing of the thermosetting resin in mica tape 71.

Favorably, the impregnating resin is a composition comprising a 45 wt % of cycloaliphatic epoxy compound, a 40 wt % of acid anhydride curing agent, and a 15 wt % of reactive diluent as disclosed in Jpn. Pat. Appln. KOKAI Publication 11-345733. This impregnating resin has a low viscosity of about 30 mPa.·s at room temperature.

The second embodiment can also attain the same advantage as that of the first embodiment.

A third embodiment will be described below.

According to the third embodiment, an adhesive 13 containing, for example, 3 wt % of polyvinyl formal, which is a kind of polyvinyl acetal, is used as a polyvinyl-based polymer that is an indispensable component as glue. A uncalcinated muscovite mica tape 71 with the adhesive 13 is wound a plurality of layers around a conductor 22. The uncalcinated muscovite mica tape 71 is formed with supporting inorganic particles 14 of aluminum nitride particles on a glass cloth backing 6.

As the adhesive 13, an epoxy resin composition (for example, Epikote 828 or 1001 manufactured by Yuka-Shell Co., Ltd.), which has mutual dissolubility with the impregnating resin, is used in addition to the polyvinyl formal After a thermosetting resin is impregnated into the wound layers of the mica tape 71 under vacuum pressurized condition, it is heated and cured with heat pressing at a pressure of 0.5 MPa while a stator coil 2 is formed so as to have a final section. Due to the heating and curing of the thermosetting resin and mica tape 71, an insulation layer 8 is formed on the periphery of the conductor 22.

Favorably, the impregnating resin is a composition comprising a 45 wt % of cycloaliphatic epoxy compound, a 40 wt % of acid anhydride curing agent, and a 15 wt % of reactive diluent as in the second embodiment. This impregnating resin has a low viscosity of about 30 mPa.·s at room temperature.

The third embodiment can also attain the same advantage as that of the first embodiment.

In the first to third embodiments, aluminum oxide ($Al_2O_3$), boron nitride (BN), or aluminum nitride (AlN) is used as the inorganic particles 14. In addition to $Al_2O_3$, BN and AlN, at least one or two or more of beryllium oxide (BeO), magnesium oxide (MgO) and silicon carbide (SiC) can be used as the inorganic particles 14.

Furthermore, one of polyvinyl alcohol, polyvinyl butyral and polyvinyl formal is used as glue contained in the adhesive. At least two of polyvinyl alcohol, polyvinyl butyral and polyvinyl formal can be used as the glue. In either case, a polyvinyl-based polymer is used as the glue.

The mica tape 71 is not limited to the first to third embodiments. Needless to say, the mica tape 71 can be applied to the insulation for a rotator coil of an electric rotating machine.

The mica tape 71 also includes a mica sheet 72 that is formed like a sheet.

As has been described above, the high thermal-conductivity inorganic particles 14 are arranged on the mica tape 71 (mica sheet 72) and supported on the mica tape 71 (72) using the adhesive 13 containing glue insoluble in the impregnating resin. Therefore, the inorganic particles 14 do not flow out, by virtue of the supporting effect of the glue, even in the process of squeezing the impregnated resin with heat pressing and then forming the insulation wall 8 to a final section. Consequently, the effect of improving the thermal conductivity of the insulation wall 8 is conspicuous and the influence of the glue on the impregnating time can be lessened.

In the mica tape 71 (mica sheet 72) of the above embodiments, the backing base material combined with the mica paper 5 is not limited to the glass cloth backing 6. A cloth-like base material, such as polyester cloth, aramid cloth and alumina cloth has only to be used as the backing base material of the mica tape 71 (mica sheet 72).

A high-efficiency electric rotating machine is achieved with a stator coil that is sufficiently improved in thermal conductivity.

What is claimed is:

1. A coil for an electric rotating machine, comprising:
a conductor configured by bundling a plurality of square strands and stacking the square strands like a coil with Roebel transposition;
mica tape which is wound a plurality of layers around a surface of the conductor and made up of mica paper and cloth backing material;
an insulation layer formed with impregnating and curing resin between wound layers of the mica tape; and
inorganic particles supported with the mica tape using an adhesive containing a first component having mutual dissolubility with the impregnating resin and a second glue component insoluble in the impregnating resin, wherein the second glue component contained in the adhesive is 0.5 wt % to 5 wt % with respect to the adhesive.

2. A coil for an electric rotating machine, comprising:
a conductor configured by bundling a plurality of square strands and stacking the square strands like a coil with Roebel transposition;
mica tape which is wound a plurality of layers around a surface of the conductor and made up of mica paper and cloth backing material;
an insulation layer formed with impregnating and curing resin between wound layers of the mica tape; and
inorganic particles supported with the mica tape using an adhesive containing a first component having mutual dissolubility with the impregnating resin and a second glue component insoluble in the impregnating resin, wherein the second glue component contained in the adhesive is a polyvinyl-based polymer, and the polyvinyl-based polymer is 0.5 wt % to 5 wt % with respect to the adhesive.

3. A coil for an electric rotating machine, comprising:
a conductor configured by bundling a plurality of square strands and stacking the square strands like a coil with Roebel transposition;
mica tape which is wound a plurality of layers around a surface of the conductor and made up of mica paper and cloth backing material;
an insulation layer formed with impregnating and curing resin between wound layers of the mica tape; and p1 inorganic particles supported with the mica tape using an adhesive containing a first component having mutual dissolubility with the impregnating resin and a second glue component insoluble in the impregnating resin, wherein the second glue component contained in the adhesive is polyvinyl alcohol, and the polyvinyl alcohol is 0.5 wt % to 5 wt % with respect to the adhesive.

4. A coil for an electric rotating machine, comprising:
a conductor configured by bundling a plurality of square strands and stacking the square strands like a coil with Roebel transposition;
mica tape which is wound a plurality of layers around a surface of the conductor and made up of mica paper and cloth backing material;
an insulation layer formed with impregnating and curing resin between wound layers of the mica tape; and
inorganic particles supported with the mica tape using an adhesive containing a first component having mutual dissolubility with the impregnating resin and a second glue component insoluble in the impregnating resin, wherein the second glue component contained in the adhesive is polyvinyl acetal, and the polyvinyl acetal is 0.5 wt % to 5 wt % with respect to the adhesive.

5. A coil for an electric rotating machine, comprising:
a conductor configured by bundling a plurality of square strands and stacking the square strands like a coil with Roebel transposition;
mica tape which is wound a plurality of layers around a surface of the conductor and made up of mica paper and cloth backing material;
an insulation layer formed with impregnating and curing resin between wound layers of the mica tape; and
inorganic particles supported with the mica tape using an adhesive containing a first component having mutual dissolubility with the impregnating resin and a second glue component insoluble in the impregnating resin, wherein the second glue component contained in the adhesive includes at least one of polyvinyl alcohol and polyvinyl acetal and is 0.5 wt % to 5 wt % with respect to the adhesive.

6. A coil for an electric rotating machine, comprising:
a conductor configured by bundling a plurality of square strands and stacking the square strands like a coil with Roebel transposition;
mica tape which is wound a plurality of layers around an outer surface of the conductor and made up of mica paper and cloth backing material;
an insulation layer formed by impregnating and curing resin between wound layers of the mica tape; and
inorganic particles supported with the cloth backing material of the mica tape using an adhesive comprising a first component having mutual dissolubility with the impregnating resin and a second glue component insoluble in the impregnating resin, wherein the second glue component contained in the adhesive is 0.5 wt % to 5 wt % with respect to the adhesive.

7. A coil for an electric rotating machine, comprising:

a conductor configured by bundling a plurality of square strands and stacking the square strands like a coil with Roebel transposition;

mica tape which is wound a plurality of layers around an outer surface of the conductor and made up of mica paper and cloth backing material;

an insulation layer formed by impregnating and curing resin between wound layers of the mica tape; and inorganic particles supported with the cloth backing material of the mica tape using an adhesive comprising a first component having mutual dissolubility with the impregnating resin and a second glue component insoluble in the impregnating resin, wherein the second glue component contained in the adhesive is a polyvinyl-based polymer, and the polyvinyl-based polymer is 0.5 wt % to 5 wt % with respect to the adhesive.

8. A coil for an electric rotating machine, comprising:

a conductor configured by bundling a plurality of square strands and stacking the square strands like a coil with Roebel transposition;

mica tape which is wound a plurality of layers around an outer surface of the conductor and made up of mica paper and cloth backing material;

an insulation layer formed by impregnating and curing resin between wound layers of the mica tape; and inorganic particles supported with the cloth backing material of the mica tape using an adhesive comprising a first component having mutual dissolubility with the impregnating resin and a second glue component insoluble in the impregnating resin, wherein the second glue component contained in the adhesive is polyvinyl alcohol, and the polyvinyl alcohol is 0.5 wt to 5 wt % with respect to the adhesive.

9. A coil for an electric rotating machine, comprising:

a conductor configured by bundling a plurality of square strands and stacking the square strands like a coil with Roebel transposition;

mica tape which is wound a plurality of layers around an outer surface of the conductor and made up of mica paper and cloth backing material;

an insulation layer formed by impregnating and curing resin between wound layers of the mica tape; and inorganic particles supported with the cloth backing material of the mica tape using an adhesive comprising a first component having mutual dissolubility with the impregnating resin and a second glue component insoluble in the impregnating resin, wherein the second glue component contained in the adhesive is polyvinyl acetal, and the polyvinyl acetal is 0.5 wt % to 5 wt % with respect to the adhesive.

10. A coil for an electric rotating machine, comprising:

a conductor configured by bundling a plurality of square strands and stacking the square strands like a coil with Roebel transposition;

mica tape which is wound a plurality of layers around an outer surface of the conductor and made up of mica paper and cloth backing material;

an insulation layer formed by impregnating and curing resin between wound layers of the mica tape; and inorganic particles supported with the cloth backing material of the mica tape using an adhesive comprising a first component having mutual dissolubility with the impregnating resin and a second glue component insoluble in the impregnating resin, wherein the second glue component contained in the adhesive includes at least one of polyvinyl alcohol and polyvinyl acetal and is 0.5 wt % to 5 wt % with respect to the adhesive.

* * * * *

UNITED STATES PATENT AND TRADEMARK OFFICE
CERTIFICATE OF CORRECTION

PATENT NO. : 7,294,788 B2 Page 1 of 1
APPLICATION NO. : 10/690644
DATED : November 13, 2007
INVENTOR(S) : Katsuhiko Yoshida et al.

It is certified that error appears in the above-identified patent and that said Letters Patent is hereby corrected as shown below:

Column 3, Line 37, after "adhered" insert --to--.

Column 6, Line 52, after "formal" insert a period.

Column 8, Line 13, delete "p1".

Signed and Sealed this

Seventeenth Day of June, 2008

JON W. DUDAS
*Director of the United States Patent and Trademark Office*